US007107549B2

(12) United States Patent
Deaton et al.

(10) Patent No.: US 7,107,549 B2
(45) Date of Patent: Sep. 12, 2006

(54) METHOD AND SYSTEM FOR CREATING AND DISTRIBUTING COLLABORATIVE MULTI-USER THREE-DIMENSIONAL WEBSITES FOR A COMPUTER SYSTEM (3D NET ARCHITECTURE)

(75) Inventors: Kenneth Deaton, Toronto (CA); Steven A. Gedeon, Toronto (CA)

(73) Assignee: 3DNA Corp., Toronto (CA)

( * ) Notice: Subject to any disclaimer, the term of this patent is extended or adjusted under 35 U.S.C. 154(b) by 297 days.

(21) Appl. No.: 10/145,576

(22) Filed: May 13, 2002

(65) Prior Publication Data

US 2004/0135820 A1    Jul. 15, 2004

Related U.S. Application Data

(60) Provisional application No. 60/290,291, filed on May 11, 2001.

(51) Int. Cl.
*G06F 13/00* (2006.01)
(52) U.S. Cl. .................. 715/836; 715/850; 715/848
(58) Field of Classification Search ............ 715/763, 715/765, 853, 854, 419, 473, 757, 851, 782, 715/836, 850, 848
See application file for complete search history.

(56) References Cited

U.S. PATENT DOCUMENTS 6,219,045 B1 * 4/2001 Leahy et al. ............... 715/757

6,636,210 B1 * 10/2003 Cheng ....................... 345/419
6,738,065 B1 *  5/2004 Even-Zohar ............... 345/473

* cited by examiner

*Primary Examiner*—Cao (Kevin) Nguyen
(74) *Attorney, Agent, or Firm*—GSS Law Group; Carol D. Titus; James J. Leary

(57) ABSTRACT

The present invention is a new 3D graphical user interface (3D GUI) technology that seamlessly integrates personal computer (PC) desktop, web portal, and data visualization functions in an intuitive 3D environment. This new paradigm in human computer interfaces provides a seamless and intuitive ability to create a 3D website, "walk" or navigate from one 3D website to another, and allows multiple users to collaborate and interact with each other and the website. The invention dynamically creates a customized 3D environment that allows intuitive access to complicated websites as well as seamless multi-user collaboration and interaction. —In a preferred embodiment of the invention—The 3D GUI installs as the active desktop on a PC, replacing the user's "wallpaper" with the 3D GUI. —In another embodiment—The 3D GUI is accessed via a standard web browser window (i.e. using Netscape Navigator or Internet Explorer). —In either of these embodiments—, The user can simply "walk" from one 3D website to another, see and communicate with other users that are also at that website, access website information and share information with other users currently visiting the website. The invention also provides a method for reducing the file size normally associated with transmitting all the content in a 3D website.

27 Claims, 5 Drawing Sheets

Prior Art 2D Desktop

… …

METHOD AND SYSTEM FOR CREATING AND DISTRIBUTING COLLABORATIVE MULTI-USER THREE-DIMENSIONAL WEBSITES FOR A COMPUTER SYSTEM (3D NET ARCHITECTURE)

CROSS REFERENCE TO OTHER APPLICATIONS

This application claims the benefit of U.S. Provisional Patent Application, Ser. No. 60/290,291, filed May 11, 2001.

COMPUTER PROGRAM LISTING

This application is filed with a computer program listing on CD-ROM, which is hereby incorporated by reference. The contents of the CD-ROM include:

| File Name | File Size | Date | Description |
|---|---|---|---|
| 3DNA_Desktop_ATI_050012.exe | 21 MB | Mar. 5, 2002 | 3DNA ATI Branded 3DNA Desktop |
| 3DNA_Hub_ATI_010005.exe | 45 MB | Apr. 15, 2002 | 3DNA ATI Branded Hub World |
| 3DNA_Desktop_Demo.avi | 145 MB | May 7, 2002 | 3DNA Demonstration Movie |

FIELD OF THE INVENTION

The present invention relates generally to the application of 3D to Graphical User Interfaces (3D GUI). It takes advantage of a number of technologies to improve the GUI including: procedural generation of 3D geometry, textures, and 3D scenes; dynamic reconfiguration of 3D content; improved organization and viewing of information; mediated peer-to-peer networking; a 3D net architecture; and enhanced data visualizations. The technology makes it simpler for the average computer user to create and use 3D websites with which they can interface to their computers and their information as well as other people and information over the Internet.

The immediate application of this 3D GUI invention is for personal computers (PCs), but there is additional application to game consoles, set-top computing platforms, mobile devices, virtual reality (VR) devices, and other computing platforms.

BACKGROUND OF THE INVENTION

Over 80% of personal computers (PCs) are already capable of supporting 3D computer graphics and nearly all of the over 120 million new desktop computers shipped in 2000 were equipped with 3D graphics chipsets. In addition, there are over 100 million game consoles (such as the Nintendo, Gamecube and Xbox) capable of generating and displaying 3D scenes on a standard television set.

PC and video games represent the most common application of 3D technology. However, computer aided design (CAD), medical imaging, animation, and video production (using Icommercial software applications such as Discreet's 3ds and Alias/Wavefront's Maya) represent alternative common applications of 3D technology.

Perhaps the best illustrations of a 3D GUI for controlling a computer come from fictional examples in Hollywood movies such as Jurassic Park, Disclosure, Lawnmower Man, and Johnny Mnemonic. However, to date, there have been no successful commercial examples of using 3D for the graphical user interface (3D GUI) that the user uses to interact with their computer.

Since the introduction of the Macintosh 2D desktop in 1984, there have been few attempts or patents that improve upon this paradigm or take advantage of the pervasive 3D hardware technology now primarily used to play games. The major companies such as Microsoft, Sony, Xerox, IBM, and SGI have contributed to the patent literature with niche applications, but none of these solve the basic technical problems that limit the ability to use 3D for the GUI. There have also been a number of small startup firms claiming to have created a 3D desktop or website (including: Clockwise Technologies, EiDoxis, and Pentad Resources) but these are simplistic examples of a non-commercially-viable 3D GUI and suffer from the following technical problems that are overcome by the present invention:

1) 3D scenes are huge, thus 3D files cannot easily be transferred over the Internet. The only solution is to use low-resolution images that look poor.
2) 3D scenes are static, thus a 3D desktop or website created for one user cannot be used for another since each user will have different applications, files, folders, shortcuts, images and song lists or different preferences.
3) 3D scenes are complex and difficult to create, thus the average person cannot create or modify one without lots of training and an expensive software package. Since the average user will want their 3D desktop or website to be personalized to their tastes, this represents a large barrier to the pervasive use of 3D websites.

Even though 3D hardware is relatively pervasive, these technical limitations have prevented the pervasive use of a 3D GUI that runs on these hardware systems.

A 3D GUI can be used to interface to a variety of applications including a user's operating system and file directory (usually referred to as a 3D Desktop), information over the Internet (referred to as a 3D website), or a specific application such as a 3D photo-editing product, or a 3D e-mail application. The present invention specifically refers to using a 3D GUI to access content over the Internet and thus is called a 3D website.

There is prior art associated with viewing 3D content over the Internet, but the vast majority of this is associated with "object viewing". Various companies allow a 3D object to be viewed within a 2D webpage such as Cycore, Viewpoint, Kaon, and Shout3D. Applications include showing how to build Ikea furniture or how to repair a Canon printer, showing the 3D object and how to move or fix it. However, these are only 3D objects that can essentially spin in space, not a navigable 3D scene that the user can walk around in.

Other companies allow the viewing of 2D web pages from within a 3D scene that resides on the user's computer such as Browse3D and Buzz3D. However, none of these allow users to move from one 3D website to another 3D website, nor do they allow users to interact with one another, nor do they allow users to even see the virtual manifestation of another in the scene (referred to as an "avatar").

There was one aborted attempt to allow the standardized viewing of 3D web pages with the introduction of the Virtual Reality Modeling Language (VRML) in 1997. However, this standard had significant limitations such as all three of the problems listed above and there are no commercial applications currently in existence.

Finally, there is prior art associated with Massively Multi-user On-Line Role Playing Games (MMORPGs) such as Everquest and Anarchy Online. These on-line games can have over 100,000 subscribers and allow users to interact with each other through the use of avatars. However, these games require huge downloads, fast Internet connections, and do not allow users to interact with traditional website content or e-commerce type applications.

Examples of previous attempts to create a 3D graphical user interface and related technologies are described in the following U.S. patents, the specifications of which are hereby incorporated

| Patent | Issued | Inventor(s) | Applicant(s) | Title |
| --- | --- | --- | --- | --- |
| 5,528,735 | June 1996 | Strasnick, Tesler | Silicon Graphics Inc. | Method and apparatus for displaying data within a three-dimensional information landscape |
| 5,786,820 | July 1998 | Robertson | Xerox Corp. | Method and apparatus for increasing the displayed detail of a tree structure |
| 5,880,733 | March 1999 | Horvitz, Sonntag, Markley | Microsoft Corp. | Display system and method for displaying windows of an operating system to provide a three-dimensional workspace for a computer system |
| 5,956,038 | September 1999 | Rekimoto | Sony Corp. | Three-dimensional virtual reality space sharing method and system, an information recording medium and method, an information transmission medium and method, an information processing method, a client terminal, and a shared server terminal |
| 6,085,256 | July 2000 | Kitano, Honda, Takeuchi | Sony Corp. | Cyber space system for providing a virtual reality space formed of three dimensional pictures from a server to a user via a service provider |
| 6,111,581 | August 2000 | Berry, Isensee, Roberts | IBM Corp. | Method and system for classifying user objects in a three-dimensional (3D) environment on a display in a computer system |
| 6,121,971 | September 2000 | Berry, Isensee, Roberts, Bardon | IBM Corp. | Method and system for providing visual hierarchy of task groups and related viewpoints of a tree dimensional environment in a display of a computer system |
| 6,175,842 | January 2001 | Kirk, Selfridge | AT&T Corp | System and method for providing dynamic three-dimensional multi-user virtual spaces in synchrony with hypertext browsing |
| 6,230,116 | May 2001 | Ronen, Amihai | Clockwise Technologies | Apparatus and method for interacting with a simulated 3D interface to an operating system operative to control computer resources |

SUMMARY OF THE INVENTION

The present invention allows computer users to create and use 3D websites that provide a seamless and intuitive ability to "walk" or navigate from one 3D website to another, and allows multiple users to collaborate and interact with each other and the website.

The invention dynamically creates a customized 3D environment that allows intuitive access to complicated websites as well as seamless multi-user collaboration and interaction. In a preferred embodiment of the invention, the 3D GUI installs as the active desktop on a PC, replacing the user's "wallpaper" with the 3D GUI. In another embodiment, the 3D GUI is accessed via a standard web browser window (i.e. using Netscape Navigator or Internet Explorer). In either of these embodiments, the user can simply "walk" from one 3D website to another, see and communicate with other users that are also at that website, access website information and share information with other users currently visiting the website.

DESCRIPTION OF THE PREFERRED EMBODIMENT

A typical configuration for a personal computer system includes a processing unit, a display, a keyboard, and a mouse. The processing unit executes a computer program called the "operating system" (O/S) which allows the operation of the computer system to be controlled either directly by the user or by other computer programs called "applications." A user operates the computer system by entering commands using the keyboard and mouse; in response, the processing unit executes the commands and presents feedback to the user via the display. The portion of the operating system that accepts the user commands and presents feedback to the user is called the "user interface".

Various schemes for implementing the user interface are generally categorized by the manner in which the user interacts with the system. For example, in a typical "command line user interface" such as DOS (by Microsoft), the user inputs text from a keyboard; in response, the computer system returns text messages to the display. However, in a Graphical User Interface (GUI) such as Windows (by Microsoft) the user can interact with the computer system by manipulating graphical objects on the display screen using the keyboard and/or the mouse and/or other peripheral devices.

The typical 2D GUI is normally described as a "desktop" metaphor. The "desktop" is the background (also called "wallpaper" if an image of some sort is used as the background) and superimposed onto the desktop are a number of "icons" and/or rectangular graphical objects called "windows". Users can interact with the computer either by working within the window application (e.g. using a word processing application or drawing application inside the window) or by launching new applications by clicking or double-clicking on icons. Another interface to the computer is achieved through the "task bar" typically located to the bottom of the screen in Microsoft Windows or the top of the screen in a Macintosh operating system.

Figure 1:
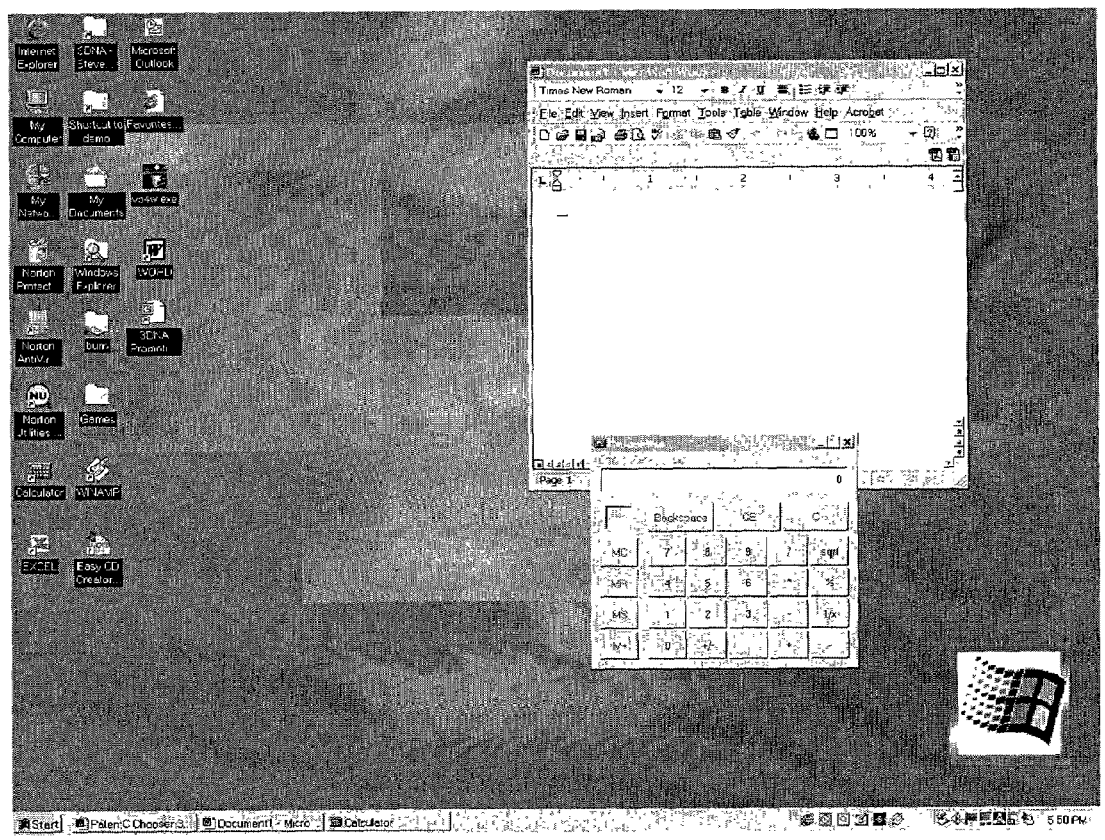
FIG. 1 illustrates a prior art 2D GUI using a "desktop" metaphor, as exemplified by the Macintosh operating system from Apple Computer, Inc. and the Windows operating system from Microsoft Corp.

The 2D GUI that computer users have become accustomed to since the introduction of the Macintosh in 1984 and later, Microsoft's Windows, is known as the "desktop" metaphor and is depicted in FIG. 1. This example of a 2D Desktop shows shortcut icons on the left, a couple of application "windows", and a Task Bar at the bottom. This metaphor has an inherent limitation. The typical monitor simply does not have the screen area to adequately display, access, and organize the many different applications, files, and sources of data in our wired lives. This is why users often require many overlapping windows, and important functions may be buried under layers of menus and multiple mouse clicks.

Figure 2:
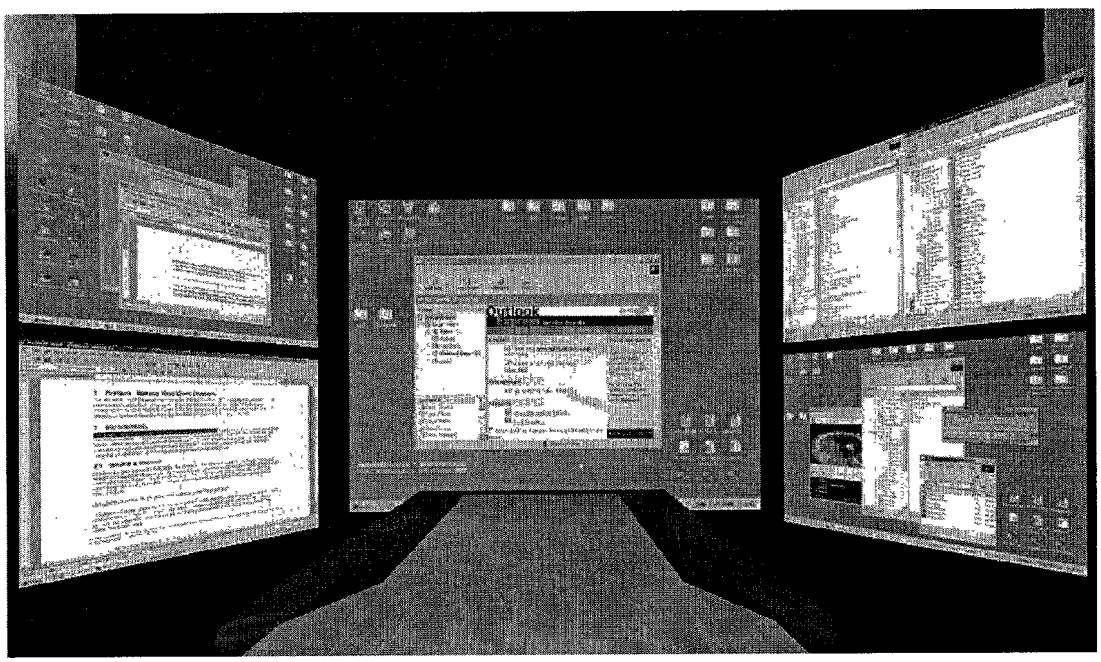
FIG. 2 illustrates how the use of a 3D GUI can increase the effective display area on a computer monitor.

The "3D Desktop" or 3D GUI invention significantly increases the "real estate" of the monitor and allows improved productivity, access to information, user customization, and a superior look and feel. A simple illustration of how 3D can increase the effective display area on a computer monitor is shown in FIG. 2. Multiple 2D Desktops are viewable in a 3D scene, illustrating the ability for a 3D Desktop to increase screen "real estate". As can be seen, the user can simply "take a virtual step back" from their normal 2D desktop and see a number of additional 2D desktops that reside in the 3D space. They can "step forward" to limit their actions to the standard desktop, or "step back" to increase the amount of real estate.

Figure 3:
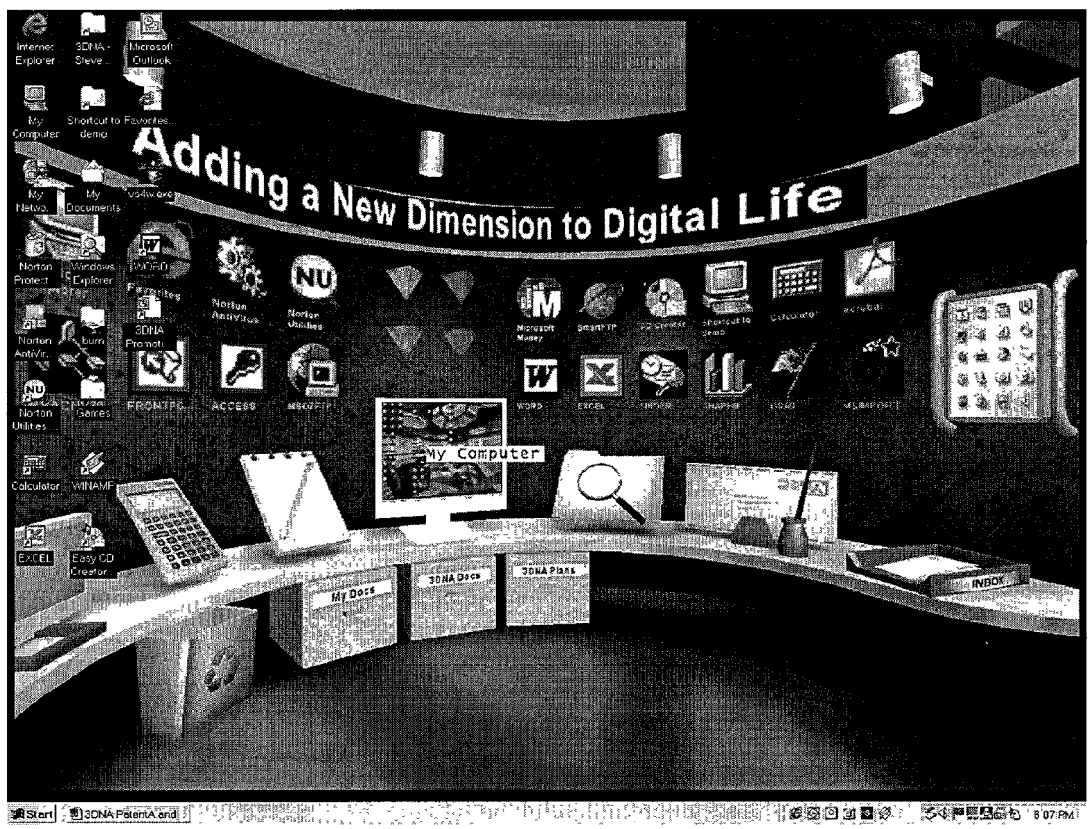
FIG. 3 illustrates how the 3D Desktop can be made to look like an office where software applications and operating system functions are represented as realistic 3D icons. Web pages, documents, and other 2D windows and icons can be deployed in the 3D space to improve access to large quantities of information.

In its simplest form, one of the goals of the present 3D Desktop invention is to achieve the intuitive organization and ease of access that we enjoy in the real world by simulating a complete work environment in a 3D virtual space. For example, as shown in FIG. 3, the 3D Desktop can actually look like an office where software applications and operating system functions are represented as realistic 3D icons (instead of the normal icons used in the standard 2D GUI). Web pages, documents, and other 2D windows and icons can be deployed in the 3D space to improve access to large quantities of information. This example of a 3D Desktop shows representational access to Operating System features such as files accessed via the filing cabinet icons, the calculator program accessed via the calculator on the desk, shortcuts accessed via traditional shortcut icons shown in the 3D space, and Outlook email management software accessed via the icon of a letter and pen. As can also be seen, the user can still click on the traditional 2D Desktop shortcut icons on the left or can click on the Task Bar at the bottom of the screen. An example of seamless integration of live Internet content can be seen by the message "Adding a New Dimension to Digital Life" streamed off of the Internet in a stock ticker style display.

Users continue to interact with the computer by clicking on icons or windows, but these icons and windows are no longer constrained to the static "real estate" of the 2D desktop and can be deployed in a 3D space instead. Navigation throughout the 3D space takes place with the mouse and keyboard in much the same way that most PC games are played (e.g. the arrow key moves you forward and back, left and right . . . ).

In one of the preferred embodiments, the 3D Desktop application replaces the static "wallpaper" with a custom 3D environment that includes customized 2D and 3D icons throughout the 3D environment to create a 3D GUI. The user can continue to click on the standard shortcuts or the standard task bar, but now has the alternative to interact with their computer by navigating in the 3D GUI and clicking on icons in the 3D GUI.

Figure 4:
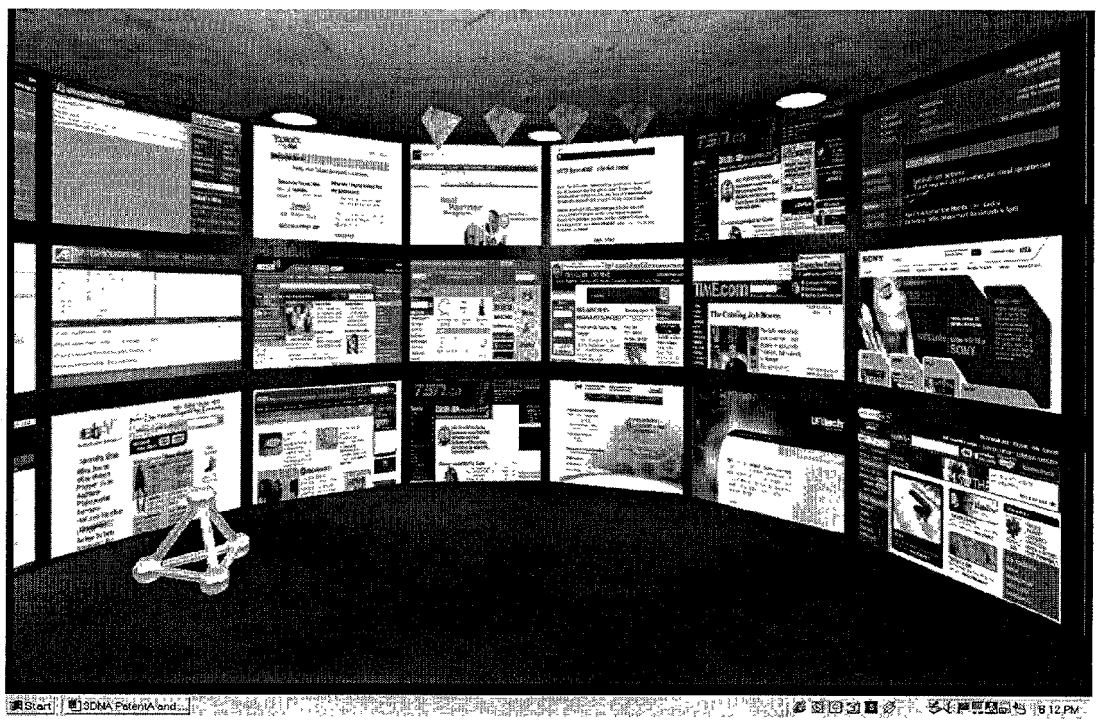
FIG. 4 illustrates how the user can view dozens of browser windows in a single glance, dynamically reconfigure content according to specifications, and seamlessly re-enter the 2D Windows metaphor as desired by simply clicking on any icon.

As can be seen, the 3DNA 3D GUI solves the three major technical problems articulated in the Background section of this patent: the 3D space is composed of procedurally generated graphic textures to reduce file size and increase resolution (note the shadows and reflections as an indication of the quality of the graphics); the user can customize every image, every shortcut, and website as well as the colors of the walls (additional authoring tool upgrades allow the ability to change the geometry or create Art Deco, Gothic and other looks and feel), the entire 3D scene can be procedurally generated, and the icons deployed about the space can be automatically arranged. The 3DNA program will scan the computer's hard drive, determine what applications and documents are available, and then procedurally generate a personalized 3D desktop with appropriate icons. In one of the preferred embodiments, there are a variety of different rooms and/or bays, specially designed to group related applications and data together as well as provide sophisticated improvements in productivity and content organization. As can be seen in FIG. 4, the user can view dozens of browser windows in a single glance, dynamically reconfigure content according to specifications, and seamlessly re-enter the 2D Windows metaphor as desired by simply clicking on any icon. Many websites can be seen at a single glance in the 3D Desktop's "browser bay". Each What You See Is What You Get or WYSIWYG Icon is a screen capture of the actual website. Clicking on any of the WYSIWYG Icons launches the corresponding web site. (In this example, the traditional 2D Desktop shortcut icons on the left have been turned off in the program.)

Seamless integration of desktop and online functions means that the weather website information can be represented by the scene outside, today's news can be streamed onto the desktop in a stock ticker, and surfing the Web is as easy as stepping from one room on your 3D desktop into another room accessed over the Internet. The user can access 3D stores, 3D chat rooms with avatars (thus seeing and communicating with the other users' as represented by their avatars), and explore immersive 3D worlds accessed over the Internet. More simply, the user can also access standard 2D websites by clicking on the 2D icons within the 3D scene.

Figure 5:
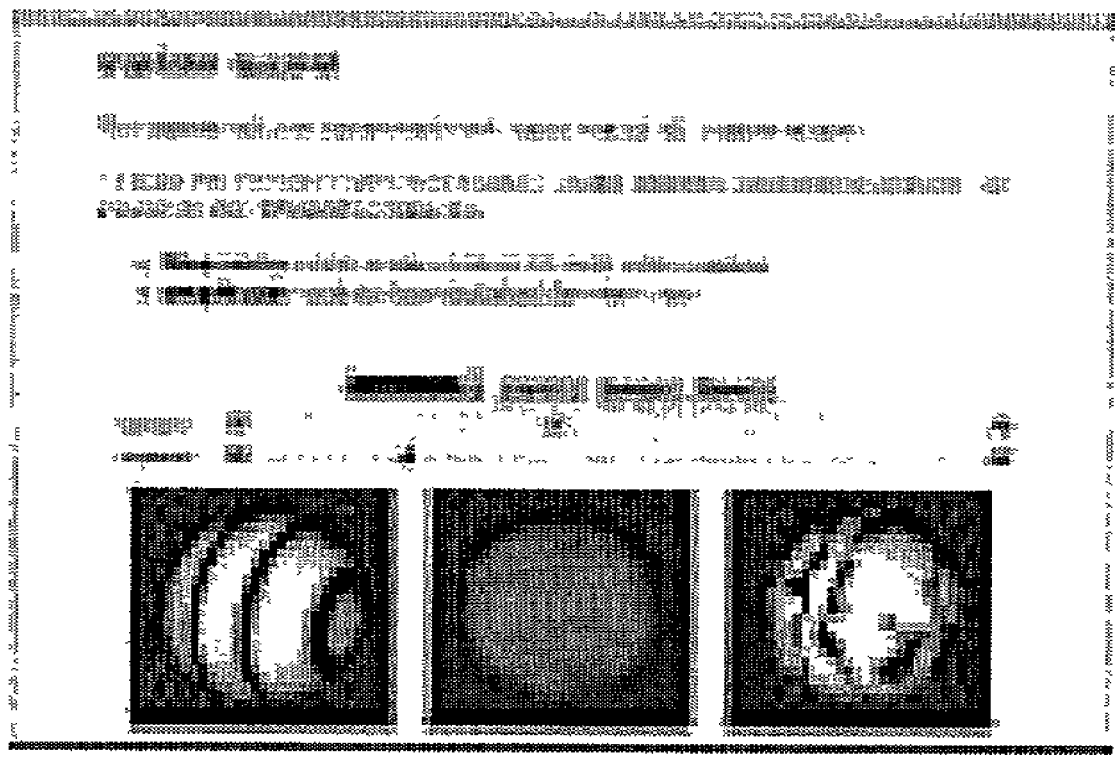
FIG. 5 illustrates the concept of "procedural generation" of textures, scenes, and GUI interfaces.

The concept of "procedural generation" of textures, scenes, and GUI interfaces can be understood with reference to FIG. 5. As can be seen, a traditional image of a 3D block of marble is composed of the 6 polygons that create the block and bit-mapped textures that are "painted" on the surface. Each bit-mapped texture can be 100 to 500 k in size and will become aliased (blocky) when viewed up close. However, by using "procedural generation" of the textures, the user can simply change 2 values using the slider control and generate all forms of marble without ever being aliased. Thus, rather than sending several hundred bytes of data, the user can transmit simply 2 numbers (plus the cube command) to send the image of a 3D block of marble. The textures can be "painted" onto any surface such as a cube, sphere, or walls, floors . . . Using this same analogy, the present invention can procedurally generate, not only textures (e.g. marble, wood, sky, carpets, roads . . . ), but also the underlying geometry (rooms, columns, walls, beaches, terrain, trees . . . ), as well as the entire 3D GUI (the scene, icons, content, and links to the users applications).

In one of the preferred embodiments, the user first downloads the 3DNA software application that contains the algorithms that decode and procedurally generate the 3D scene and location of objects, avatars, and icons. When the user accesses a 3D scene hosted over the Internet, the application is sent a .3DNA "seed file" that contains all the higher level instructions to re-create the 3D scene on the users computer. In contrast to the much larger VRML (Virtual Reality Modeling Language) file that sends all the vertices and polygons, the 3DNA file instead provides higher level information. For example, to transmit a bookcase over the Internet using VRML, the file must contain an exhaustive list of every vertex and polygon for every book, shelf, and object of interest. In contrast a 3DNA file could contain merely the information for the height of the bookshelf, the number of shelves and the number of books and then dynamically re-create the bookshelf on the user's computer rather than transmitting the entire set of information.

As can be seen, one obvious improvement using the 3DNA scheme is the ability for the end user or the website owner to seamlessly and easily allow customization of the scene since it is easy to simply change a few parameters (e.g. the number of books, or the randomness of the book placement) and thus create a new and customized scene.

Similarly, rather than transmitting all the information about an avatar's polygons and how it changes from moment to moment as they move about the scene, the .3DNA seed file can transmit merely the incremental avatar information such as direction, speed, and movement type (run, fly, walk, stagger . . . ) and the end user's computer can do all the required calculations to create the scene rather than have the calculations take place server side and then have all the resulting polygons transmitted over the Internet.

In another embodiment of the invention, the end user first downloads the 3DNA application that contains a base 3D scene template or number of templates and the algorithms required to modify the scene to place objects, websites, icons, and avatars into the scene. When the user goes to a 3D website, they download a .3DNA file that contains the information needed to complete the scene as well as any .html files required that contain information such as 2D content located in the scene. When the user enters the world and moves about in the scene, his/her computer sends a small file that provides the information about their avatar as well as any positional and movement information.

This dynamic scene generation and reduced requirement to transmit large amounts of information allows large numbers of users to share in a collaborative 3D world using mediated peer-to-peer file sharing technology. Thus, multiple users can all enter a shared 3D world (sharing the scene and their avatars' positions) bring their files along with them (most likely using the standard .html file format), and then share the information with each other by viewing the same information at the same time, and/or clicking through the icons located in the 3D scene. These multiple users can communicate with each other using standard technology such as chat, instant messaging and/or voice over IP (VoIP).

What is claimed is:

1. A system for creating and distributing 3D websites for a computer system including:
   a. customizable 3D space containing scenes (rooms, sky, worlds), objects and icons;
   b. means to navigate throughout the 3D space to view, manipulate, and click on the scene elements, objects, and/or icons;
   c. means for the user to interface with the information, applications, web pages, files or underlying data through the icons in 3D space, wherein the 3D scene is automatically created on the end user's computer based on a seed file issued by a server that parametrically generates the 3D scene on the end user's computer;
   d. means for transmitting the scenes, navigation, and icons over the Internet.

2. A system for creating and distributing 3D web sites for a computer system according to claim 1, wherein:
   the 3D scene is automatically created on the end user's computer based on a template 3D scene already resident on the end user's computer and the seed file that parametrically generates the remainder of the 3D scene.

3. A system for creating and distributing 3D websites for a computer system according to claim 1, wherein:
   the 3D scene is automatically created on the end user's computer based on a template 3D scene already resident on the end user's computer and the seed file that generates the icons, objects and other information in the 3D scene.

4. A system for creating and distributing 3D web sites for a computer system according to claim 1, wherein:
   the 3D scene can be dynamically altered based on certain user-defined criteria.

5. A system for creating and distributing 3D websites for a computer system according to claim 1, wherein:
the 3D scene seamlessly integrates content from the Internet.

6. A system for creating and distributing 3D websites for a computer system according to claim 1, including:
means for multiple users to navigate and interact with the scene and objects at the same time.

7. A system for creating and distributing 3D websites for a computer system according to claim 1, wherein:
the communication between end users is conducted using mediated peer-to-peer technology and the users need only send their avatars' basic information to each other once and then need only send seed information.

8. A system for creating and distributing 3D websites for a computer system according to claim 7, wherein the seed information is selected from a group of seed information consisting of: position, movement direction, movement speed, walking, flying, actions and clicking on an icon.

9. A system for creating and distributing 3D websites for a computer system according to claim 1, wherein:
the users can collaborate with each other by viewing the same information at the same time.

10. A system for creating and distributing 3D websites for a computer system according to claim 1, wherein:
the users can collaborate with each other by bringing new files into the 3D space along with their avatars.

11. A system for creating and distributing 3D websites for a computer system according to claim 1, wherein:
the users can collaborate with each other by speaking with each other on-line text chat, instant messaging and/or using voice over IP (VoIP) or other verbal communication technology.

12. A system for creating and distributing 3D websites for a computer system according to claim 1, wherein:
the users can intuitively move from 3D website to 3D website by simply "walking" from one room into another.

13. A system for creating and distributing 3D websites for a computer system according to claim 1, wherein:
the 3D website is platform independent and can be used on a PC, game console, set-top box, wireless device, mobile device, or virtual reality device.

14. A system for creating and distributing 3D websites for a computer system according to claim 1, wherein:
the 3D website is configured to be used for e-commerce, on-line shopping, stock market, financial, real estate, telco, or Internet service provider industries.

15. A system for creating and distributing collaborative multi-user 3D websites for a computer system including:
a. customizable 3D space containing scenes (rooms, sky, worlds), objects and icons wherein the 3D space is automatically created on the end user's computer based on a seed file issued by a server that parametrically generates the 3D space on the end user's computer;
b. means to navigate throughout the 3D space to view, manipulate, and click on the scene elements, objects, and/or icons;
c. means for the user to interface with the information, applications, web pages, files or underlying data through the icons in 3D space;
d. means for transmitting the scenes, navigation, and icons over the Internet;
e. means for multiple users to navigate and interact with the scene, objects, icons, and each other at the same time.

16. A system for creating and distributing collaborative multi-user 3D websites for a computer system according to claim 15, wherein:
the 3D scene is automatically created on the end user's computer based on a template 3D scene already resident on the end user's computer and a seed file issued by a server that parametrically generates the remainder of the 3D scene.

17. A system for creating and distributing collaborative multi-user 3D websites for a computer system according to claim 15, wherein:
the 3D scene is automatically created on the end user's computer based on a template 3D scene already resident on the end user's computer and a seed file issued by a server that generates the icons, objects and other information in the 3D scene.

18. A system for creating and distributing collaborative multi-user 3D websites for a computer system according to claim 15, wherein:
the 3D scene can be dynamically altered based on certain user-defined criteria such as selecting the desired color scheme or type of architecture desired.

19. A system for creating and distributing collaborative multi-user 3D websites for a computer system according to claim 15, wherein:
the 3D scene seamlessly integrates content from the Internet.

20. A system for creating and distributing collaborative multi-user 3D websites for a computer system according to claim 15, wherein:
the communication between end users is conducted using mediated peer-to-peer technology and the users need only send their avatars' basic information to each other once and then need only send seed information such as position; movement direction and speed; movement information such as running, walking or flying; and actions such as clicking on an icon.

21. A system for creating and distributing collaborative multi-user 3D websites for a computer system according to claim 15, wherein:
the users can collaborate with each other by viewing the same information at the same time.

22. A system for creating and distributing collaborative multi-user 3D websites for a computer system according to claim 15, wherein:
the users can collaborate with each other by bringing new files into the 3D space along with their avatars.

23. A system for creating and distributing collaborative multi-user 3D websites for a computer system according to claim 15, wherein:
a. the users can collaborate with each other by speaking with each other on-line text chat, instant messaging and/or using voice over IP (VoIP) or other verbal communication technology.

24. A system for creating and distributing collaborative multi-user 3D websites for a computer system according to claim 15, wherein:
the users can intuitively move from 3D website to 3D website by simply "walking" from one room into another.

25. A system for creating and distributing collaborative multi-user 3D websites for a computer system according to claim 15, wherein:

the 3D website is platform independent and can be used on a PC, game console, set-top box, wireless device, mobile device, or virtual reality device.

26. A system for creating and distributing collaborative multi-user 3D websites for a computer system according to claim 15, wherein:

the 3D website is used for e-commerce, on-line shopping, stock market, financial, real estate, telco, or Internet service provider industries.

27. A system for creating and distributing collaborative multi-user 3D Graphical User Interfaces (3D GUI) for a computer system including:

a. customizable 3D space containing scenes (rooms, sky, worlds), objects and icons;

b. means to navigate throughout the 3D space to view, manipulate, and click on the scene elements, objects, and/or icons;

c. means for the user to interface with the information, applications, web pages, files or underlying data through the icons in 3D space;

d. means for transmitting the scenes, navigation, and icons over the Internet;

e. means for multiple users to navigate and interact with the scene, objects, icons, and each other at the same time in a peer-to-peer manner;

f. means for the 3D GUI and underlying content to be accessed over the Internet.

* * * * *